United States Patent [19]

Logan

[11] 4,214,195

[45] Jul. 22, 1980

[54] MOTOR CONTROL CIRCUITS

[75] Inventor: Robert J. Logan, Sheffield, England

[73] Assignee: Inductive Controls Limited, Sheffield, England

[21] Appl. No.: 888,300

[22] Filed: Mar. 20, 1978

[30] Foreign Application Priority Data

Mar. 22, 1977 [GB] United Kingdom ............... 12132/77

[51] Int. Cl.$^2$ .............................................. H02P 7/64
[52] U.S. Cl. .................................. 318/745; 318/813; 318/815
[58] Field of Search ............... 318/745, 812, 813, 814, 318/815

[56] References Cited

U.S. PATENT DOCUMENTS

| | | | |
|---|---|---|---|
| 2,712,105 | 6/1955 | Mathias et al. | 318/745 |
| 2,725,511 | 11/1955 | Jacobs | 318/745 |
| 2,734,157 | 2/1956 | McKenney et al. | 318/745 |
| 2,918,614 | 12/1959 | Westfelt | 318/745 |

Primary Examiner—J. V. Truhe
Assistant Examiner—Eugene S. Indyk

Attorney, Agent, or Firm—Kemon & Estabrook

[57] ABSTRACT

A motor control circuit comprises first, second and third saturable reactors connected between three supply lines and the three phases of a motor. The reactors can be excited to energize the motor to give a high torque output in a forward direction. Two further reactors ("reverse" reactors) are connected between the second and third supply lines and the third and second motors phases.

In the "forward" condition, the "reverse" reactors are unexcited and have line voltage across them. To drive the motor in the reverse direction at a lower torque level, the first reactor and the "reverse" reactors are excited at a lower level and the second and third reactors are unexcited. However, the latter two reactors are made to operate at a point above the magnetization curve knee point by passing current through them up to their full-load current, and they are thereby "stretched" across a voltage only slightly (say 13%) above the phase voltage. Hence, only the fourth and fifth reactors have to withstand full line voltage.

6 Claims, 5 Drawing Figures

MOTOR CONTROL CIRCUITS

This invention relates to the control of squirrel cage induction motors, and particularly to the reversing of such motors when used in applications where the required torque is lower in one direction of rotation of the motor than in the other.

This condition occurs in applications such as hoists, cranes and lifts, where a larger torque is required to raise a load than to lower it.

Figure 1:
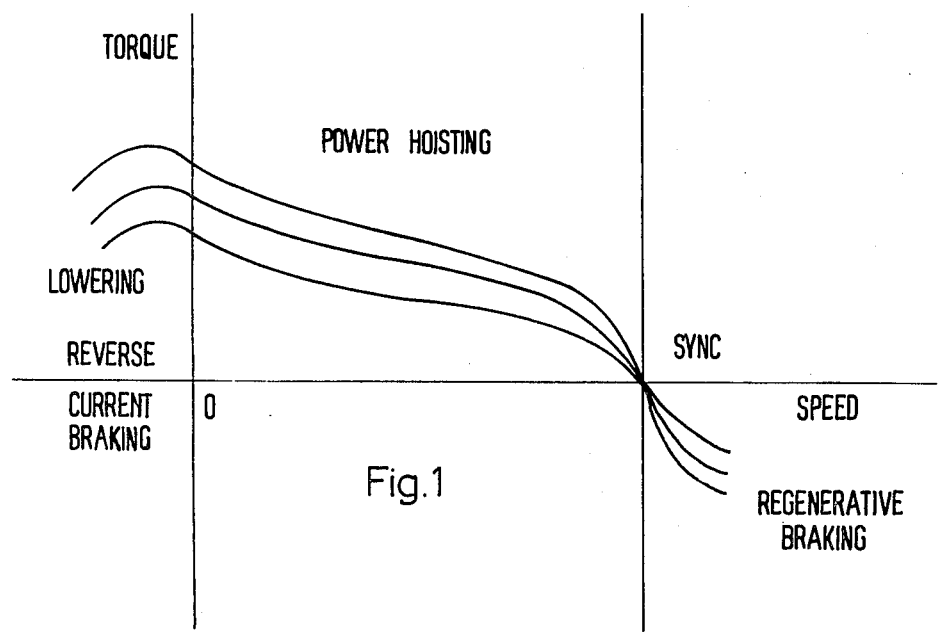

Our copending British Patent Application No. 12133/77 discloses a squirrel cage induction motor, the speed of which can be controlled by varying the applied voltage. FIG. 1 of the accompanying drawings illustrates the general shape of the family of torque/speed curves which are obtainable for various voltages applied to such a squirrel cage motor. The torque decreases, without reversal of slope of the curve, throughout the speed range from zero to synchronous speed. If the motor is driven by an external force, such as a descending load, so that the rotor speed exceeds the synchronous speed, the motor will act as an asynchronous generator and will feed power into the supply so that regenerative braking of the motor takes place.

From the family of curves it will be seen that for a given applied voltage, the speed of the motor will set itself at the level corresponding to the demanded torque, and that for a given demanded torque the speed will vary with the applied voltage.

The applied voltage can be very conveniently controlled by means of saturable reactors connected between the motor stator windings and the supply phases, the impedance of the saturable reactor windings being controlled by variation of the d.c. current fed through excitation windings of the reactors.

Reversal of the motor can be achieved by effectively interchanging the connections of two of the phases to the motor, so that the phase sequence is reversed.

The present invention provides a control circuit for a three phase squirrel cage induction motor, whereby the reversal of the direction of rotation of the motor is achieved by means of saturable reactors.

This could be done by connecting three saturable reactors between the three supply phases and the three motor phases, which reactors are saturated to give motor rotation in a forward direction; and connecting two further identical reactors between two of the motor phases and the reverse two of the supply phases, these reactors being unexcited (and therefore having a high impedance) in the forward rotation condition. In order to reverse the rotation, the latter two "reverse" reactors would be excited, and the two "forward" reactors which are connected to the same motor phases would be unexcited, so that the two supply phases connected to those motor phases are reversed.

However, such an arrangement causes almost the full line (phase-to-phase) voltage to be applied across each reactor when it is unexcited, so that the reactors must all be designed to withstand such voltage.

The present invention provides such a saturable reactor arrangement for use where a lower reverse torque is required, in which only two of the five reactors need to be designed for line voltage, whilst the others are designed for only slightly more than the phase voltage. A smaller overall size of the equipment can therefore be achieved.

According to the invention, a control circuit for controlling the direction of rotation of a squirrel cage motor fed from a three-phase supply comprises first, second and third saturable reactors to be connected, respectively, between first, second and third phases of the supply and first, second and third phases of the motor stator; a fourth saturable reactor to be connected between the second supply phase and the third motor phase; a fifth saturable reactor to be connected between the third supply phase and the second motor phase; and means to supply direct current selectively to excitation windings on the saturable reactors to cause near saturation of the cores of the first, second and third reactors to run the motor in one direction in a high torque condition, whilst the fourth and fifth reactors are in an unexcited/high impedance state, and to cause partial excitation of the first, fourth and fifth reactors for reverse running of the motor in a lower torque condition, whilst the second and third reactors are in an unexcited state with a magnetising current flowing therethrough greater than that required for operation at the knee point of the magnetisation curve, but not greater than the full load design current of said reactors.

Figure 5:
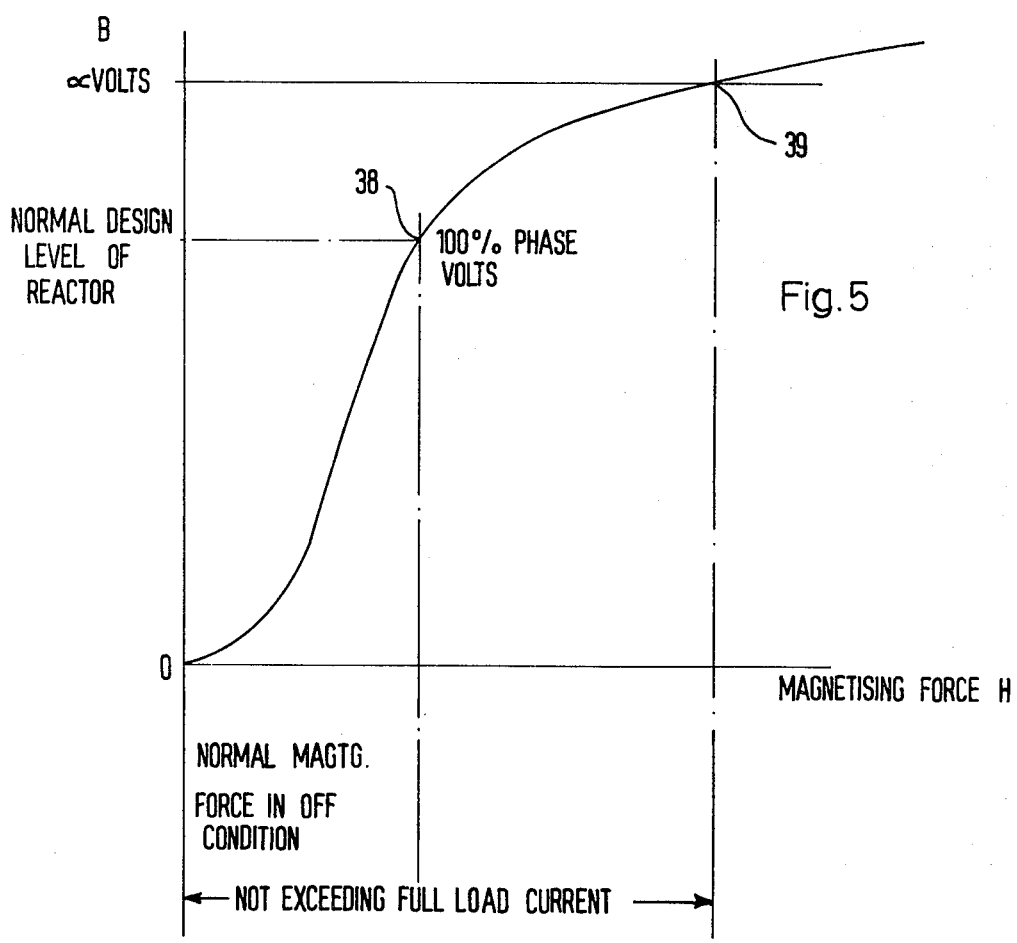
Figure 2:
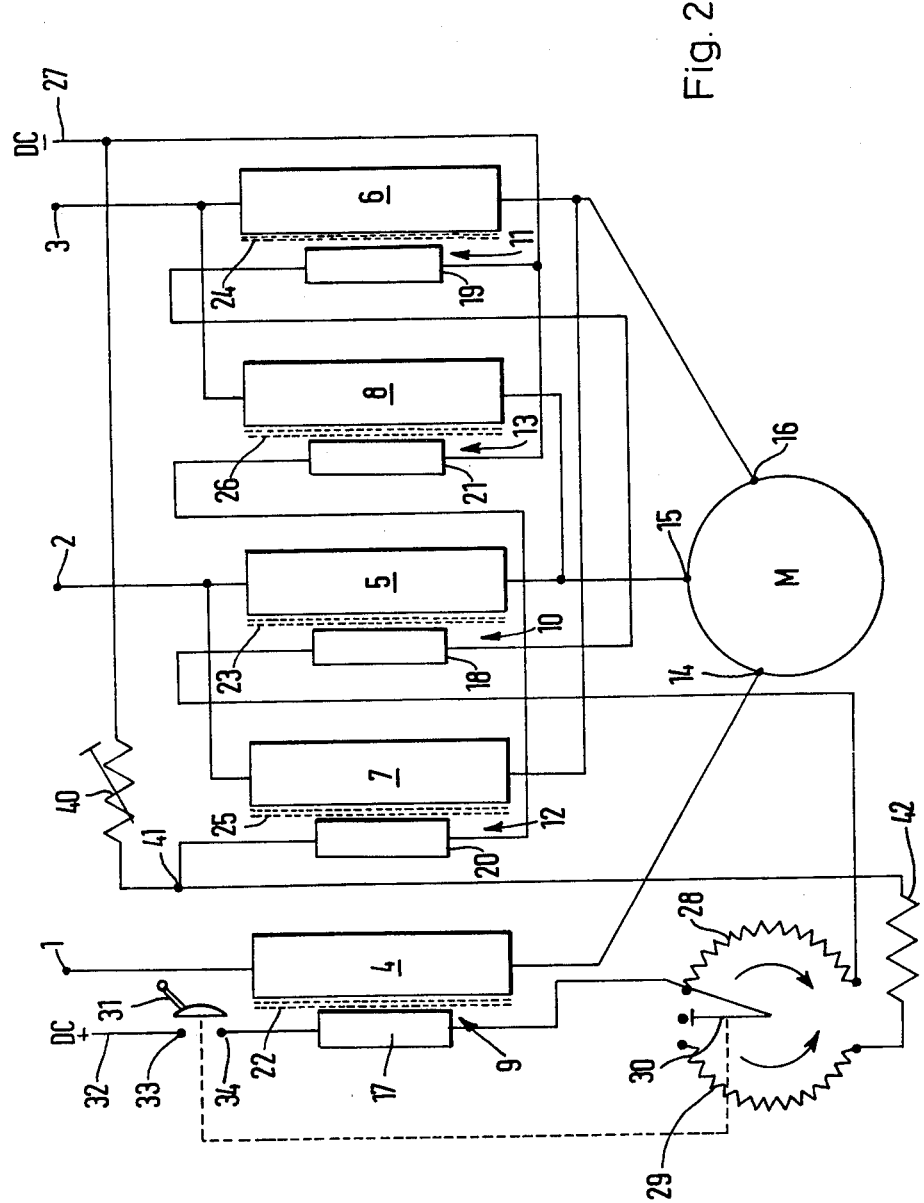
Figure 3:
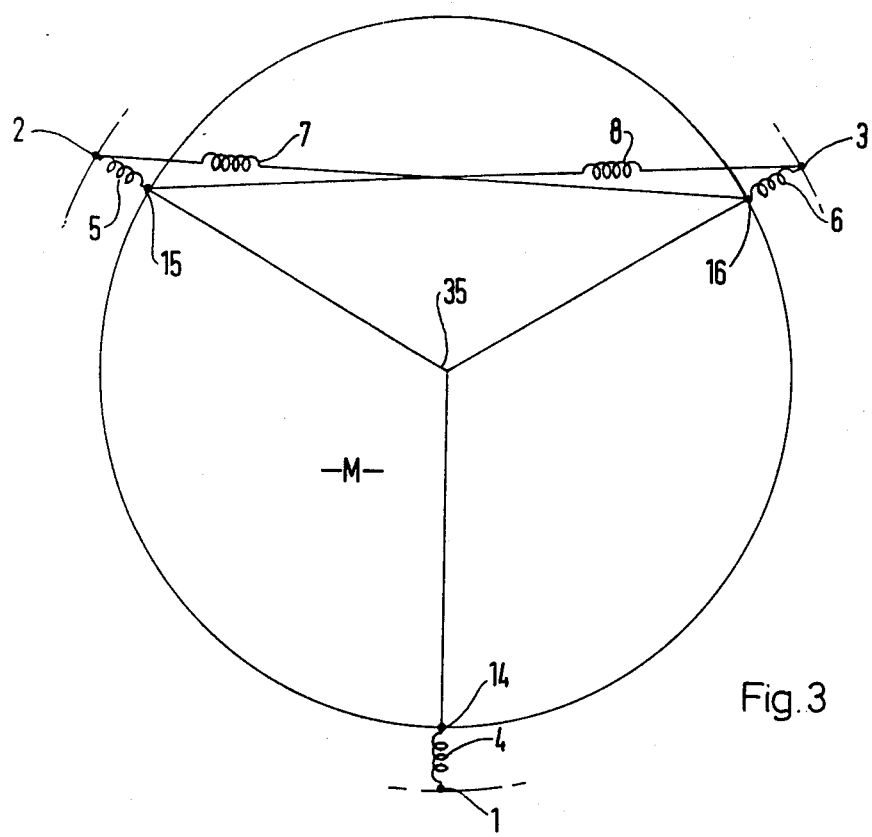
Figure 4:
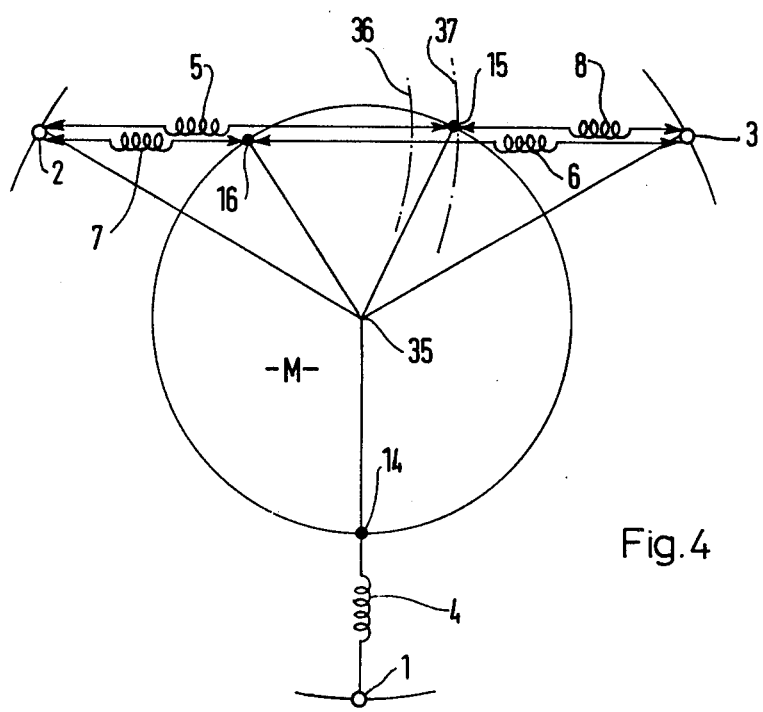

An embodiment of the invention will now be described, by way of example, with reference to the accompanying drawings, in which:

FIG. 1 illustrates the family of torque speed curves of a squirrel cage induction motor as described in our Patent Application No. 12133/77 as mentioned previously, FIG. 2 is a block schematic diagram of a control circuit in accordance with the invention, the control circuit being connected to a motor, FIG. 3 and FIG. 4 are vector diagrams indicating the voltages existing in the motor circuit for forward and reverse rotation, respectively, of the motor, and FIG. 5 is a curve showing the reactor voltage/magnetising force characteristic.

Referring now to FIG. 2 of the drawings, a motor M is connected to lines 1, 2 and 3 of a 3-phase supply via main windings 4 to 8 of saturable reactors 9–13, respectively. The windings 4, 5 and 6 are respectively connected between the lines 1, 2 and 3 and respective phase terminals 14, 15 and 16 of the motor. These windings control the "forward" rotation of the motor. The windings 7 and 8 are respectively connected between the lines 2 and 3 and the motor phase terminals 16 and 15, i.e. the configuration is the reverse of the configuration of the windings 5 and 6. Hence, the windings 4, 7 and 8 control the "reverse" rotation of the motor M.

The reactors 9 to 13 are provided with excitation windings 17 to 21, respectively, each closely magnetically coupled to the respective main windings 4 to 8 by magnetic cores 22 to 26, on which the respective main and excitation windings are mounted.

The excitation windings 18 and 19 of the "forward" reactors 10 and 11 are connected in series between a negative d.c. line 27 and one end of a variable resistor 28. Similarly, the excitation windings 20 and 21 of the "reverse" reactors 12 and 13 are connected in series between the line 27 and a fixed resistor 42 in series with a variable resistor 29.

A common wiper 30 makes contact with the resistor 28 or with the resistor 29, or locates in an intermediate "off" position, depending upon the setting of a control lever 31 to which the wiper is coupled. The wiper is connected to one end of the excitation winding 17, the other end of which is connected to a positive d.c. line 32 via contacts 33 and 34 which are closed, against the action of a spring, by continuous pressure on the lever 31 which thereby acts as a "dead-man's handle".

When the lever 31 is set at "off", no excitation current will flow through the windings 17 to 20, since the contacts 33 and 34 will be open and the wiper 30 will be in its intermediate position. The cores 22–26 will be at a low level of magnetisation, and the main windings 4 to 8 will therefore be in a high impedance state. The only current flowing through these windings will be a small magnetising current. The impedance of the main windings 4 to 8 in this state will be very much greater than that of the stator windings (not shown) of the motor, and the major part of the supply phase voltage will therefore be dropped across the main windings. The motor terminals 14 to 16 will be at approximately the same potential, close to the potential of the supply neutral point.

In order to cause "forward" rotation of the motor M, the lever 31 is depressed to close the contacts 33 and 34 and is moved so that the wiper 30 makes contact with the resistor 28. Excitation current flows through the windings 17, 18 and 19, the magnitude of the current being dependent upon the position of the wiper on the resistor 28. This position is controlled by the operator to give the demanded torque and speed, for example for raising a load.

If the resistor 28 is set at the minimum resistance position, the reactors 9, 10 and 11 will be fully excited and the main windings will therefore present a low impedance between the lines 2 to 4 and the motor terminals 14 to 16. The full supply voltage will be applied to the motor M, which will develop the maximum starting torque.

When the "forward" reactors 9, 10 and 11 are excited, no excitation current flows in the excitation windings 20 and 21 of the "reverse" reactors 12 and 13. Only a small magnetising current flows in the main windings 7 and 8. The voltage across these windings will be almost equal to the line voltage, as seen from the diagram in FIG. 3 of the drawings. The circle represents the voltage of the motor terminals 14 to 16 in relation to the neutral point 35, and the relative phases of those voltages. The magnitude of the voltages is slightly less than the phase voltage (i.e. the voltage between the lines 1, 2, 3 and the neutral point) due to the small voltage drop across the windings 4, 5 and 6. The voltage across the winding 7 is the vector sum of the voltage between the line 2 and the neutral point 35 and the voltage between the motor terminal 16 and the neutral point. The voltage across the winding 8 is similarly derived with reference to the line 3 and the motor terminal 15.

Since the voltages appearing across the windings is almost equal to the line voltage, the reactors 12 and 13 must be designed to withstand the line voltage.

If, now, rotation in the reverse direction at a lower torque is required, for example for lowering a load, the wiper 30 is moved into contact with the resistor 29. The reactor 9 and the "reverse" reactors 12 and 13 will be only partially excited so that a reduced voltage is applied to the motor terminals. This voltage may be up to 57% of the phase voltage, giving, for example, a starting torque of 32% of the normal maximum starting torque, i.e. a torque approximately equal to full load torque in a motor which is capable of developing 300% full load torque at starting on full phase voltage. The maximum excitation current is limited by the resistor 42.

The resultant vector diagram is shown in FIG. 4 of the drawings. The circle representing the motor terminal voltage is, in this case, smaller than that of FIG. 3. The voltages at the lines 2, 3 and 4 lie on a circle which is, of course, the same diameter as the corresponding circle in FIG. 3.

In FIG. 4 the points representing the motor terminals 15 and 16 are reversed relative to FIG. 3 and are closer together round the circle. The position of the point representing the terminal 16 is determined by the voltage drop across the partially-excited reactor main winding 7 connected between the line 2 and the motor terminal 16, and the voltage across the main winding 6 of the unexcited reactor 11, which winding is connected between the terminal 16 and the line 3.

The position of the point representing the terminal 15 is similarly determined. An arc 36 struck with its centre at the line 2 point and with a radius equal to the distance between the points 2 and 35 represents the magnitude of the phase voltage. An arc 37 from the same centre and passing through the point representing the terminal 15 represents the resultant voltage across the winding 5.

By comparison of the arcs, it will be seen that this resultant voltage is only slightly larger than the phase voltage, and it is this voltage only, not the line voltage, which the reactor 10, and likewise the reactor 11, must be designed to withstand.

Referring to FIG. 5 of the drawings, each of the reactors 10 and 11 is designed to operate along a B/H curve such as that shown. A point 38 on that curve represents the magnetising force which results from zero current in the excitation winding and a voltage equal to the phase voltage across the main winding.

In order to make the reactors 10 and 11 operate in the manner described above with reference to FIG. 4, the reactors 10 and 11 are "stretched" across the voltage slightly in excess (e.g. 113%) of the phase voltage and the operating point moves up the B/H curve to a point 39. At this point a considerably higher magnetising current flows in each reactor 10 and 11 than at the design point 38, as indicated by the distance along the horizontal axis, but this current must not exceed the full load design current of the reactor.

To summarise the invention, the "forward" reactors 10 and 11 are designed to have a magnetisation point at the knee of the B/H curve for phase voltage applied thereacross and zero excitation current. When the control circuit is set to "reverse", these reactors are unexcited, and the other three reactors are partially excited so that the motor voltage is no more than 57% of the phase voltage, thereby giving a reduced torque. The magnetising current rises to a level not exceeding the full load current of the reactor, and the resultant voltage across the reactors 10 and 11 does not rise to the line voltage level but merely to, say, 1.13 times the phase voltage. The reactors 10 and 11 can, therefore, be considerably smaller than if they had to be designed to withstand line voltage.

A resistor 40 (FIG. 2) may be connected between the line 27 and one end 41 of the winding 20 to provide an adjustable bypass across the windings 20 and 21. This can be used to adjust the excitation of the reactors 12 and 13 relative to that of the reactor 9, either to achieve equalisation of the three voltages applied to the terminals 14, 15 and 16 or deliberately to unbalance those voltages, thereby offsetting the neutral point 35 and causing production of negative sequence torque components which can provide a useful controlling factor.

I claim:

1. A squirrel cage motor control circuit for controlling the direction of rotation of a motor having first, second and third stator windings to be fed from a three-phase supply, and having a squirrel cage rotor, said circuit comprising first, second and third saturable reactors having respective main windings to be connected, respectively, between first, second and third phases of the supply and said first, second and third stator windings; a fourth saturable reactor having a main winding to be connected between said second supply phase and said third stator winding; a fifth saturable reactor having a main winding to be connected between said third supply phase and said second stator winding; each said saturable reactor having respective excitation winding means, and each of said second and third saturable reactors having a magnetisation curve relating magnetising force and applied voltage which exhibits a knee point for zero current in the respective excitation winding means and for substantially the phase voltage applied across the main winding; the circuit further comprising means to supply direct current selectively to the excitation winding means to cause at least near saturation of the cores of said first, second and third reactors to run the motor in one direction in a high torque condition, whilst said fourth and fifth reactors are in an unexcited/high impedance state; and to limit excitation of said first, fourth and fifth reactors to only partial excitation for running the motor in the reverse direction in a lower torque condition, whilst said second and third reactors are in an unexcited state and a magnetising current flows therethrough greater than that required for operation at said knee point but not greater than the full load design current of said main windings of said second and third reactors.

2. A circuit as claimed in claim 1, wherein said direct current supply means is adapted to connect said excitation winding means of said first, second and third reactors in a first series circuit with each other and with first variable resistance means, and to connect said first series circuit across a d.c. supply only for rotation of the motor in said one direction.

3. A circuit as claimed in claim 2, wherein said direct current supply means is adapted to connect said excitation winding means of said first, fourth and fifth reactors in a second series circuit with each other and with second variable resistance means, and to connect said second series circuit across said d.c. supply only for rotation of the motor in said reverse direction.

4. A circuit as claimed in claim 3, wherein the first and second variable resistance means are operable by a common operating lever which also controls a switch in the d.c. supply.

5. A circuit as claimed in claim 4, wherein said switch is normally open and for operation of the motor must be closed by continuous pressure on the operating lever.

6. A circuit as claimed in claim 3, including a balance resistor across the series-connected excitation windings of said fourth and fifth reactors.